United States Patent Office 3,543,343
Patented Dec. 1, 1970

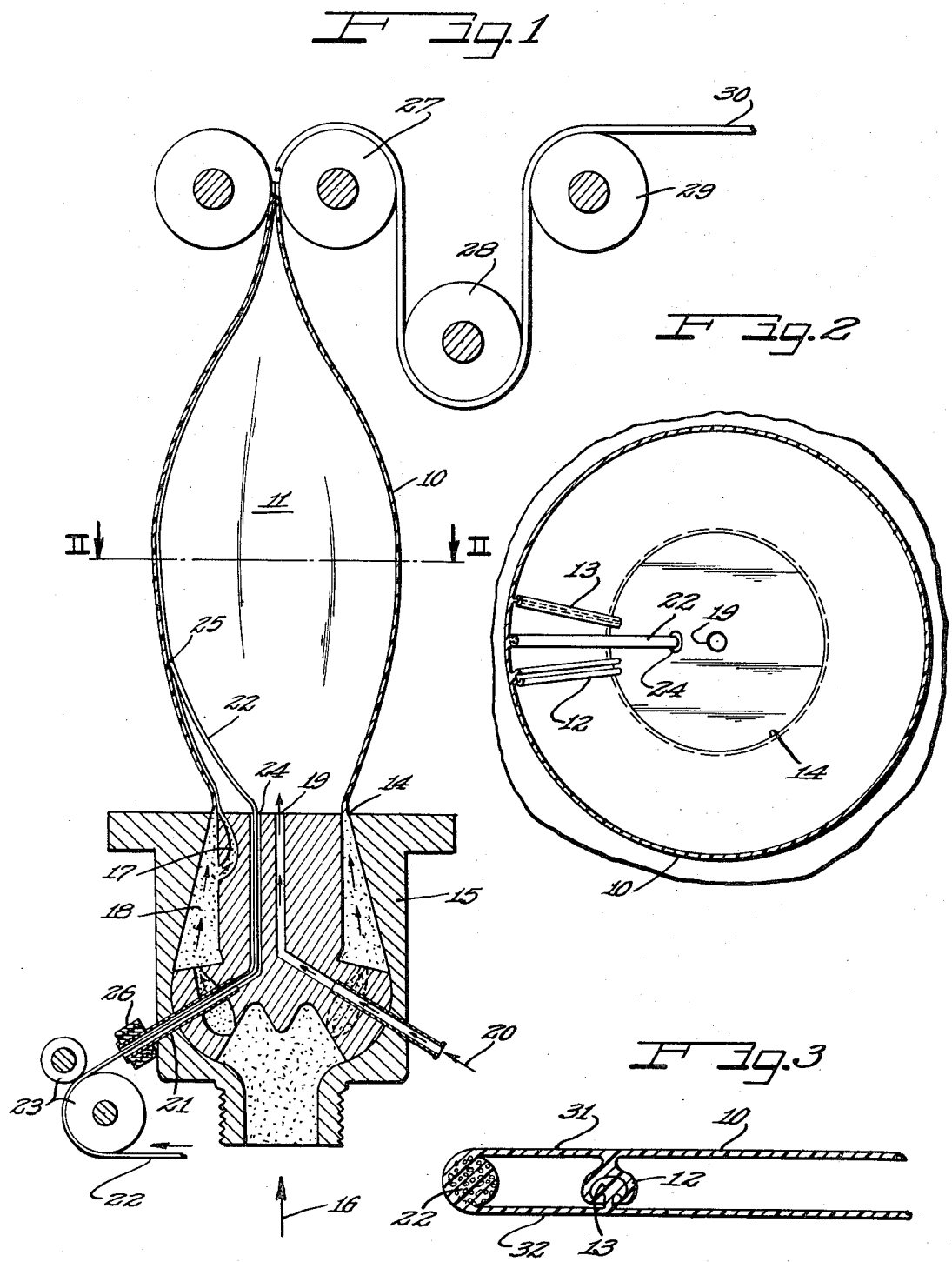

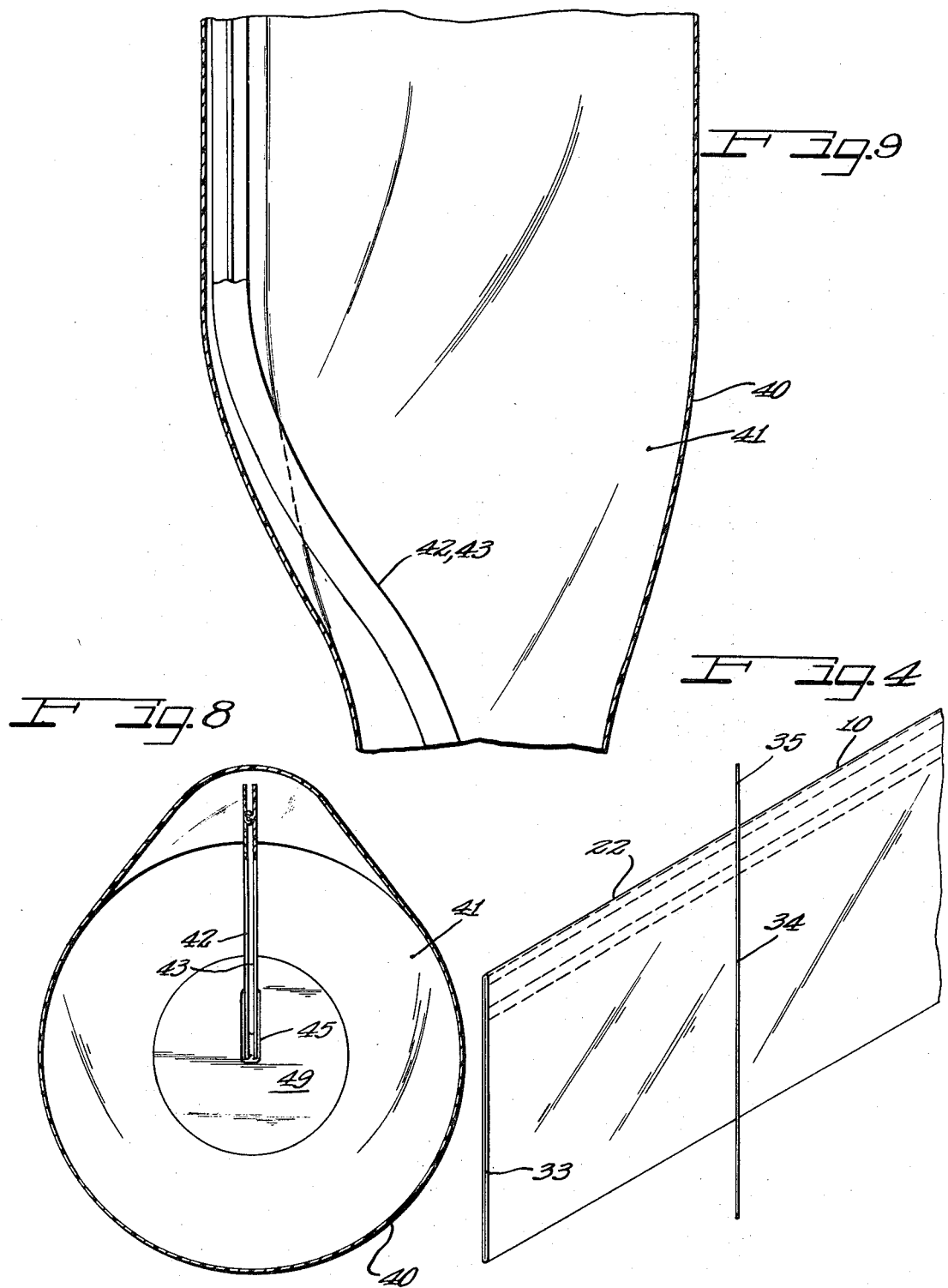

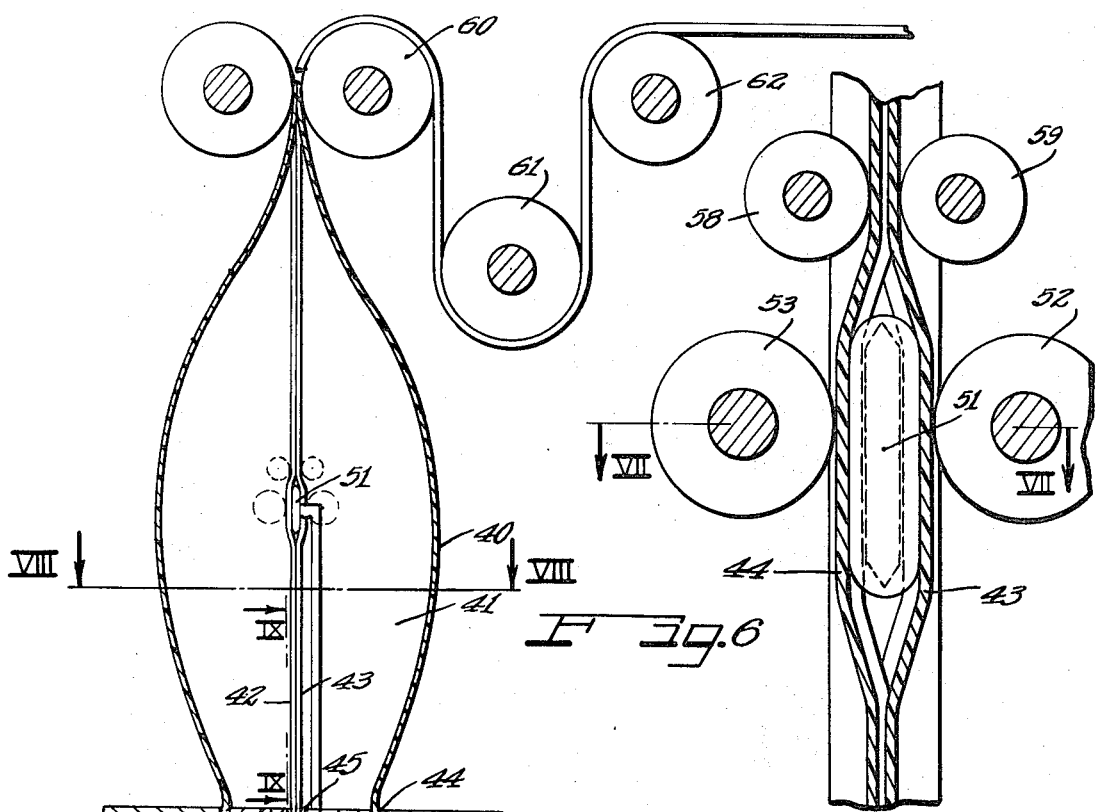
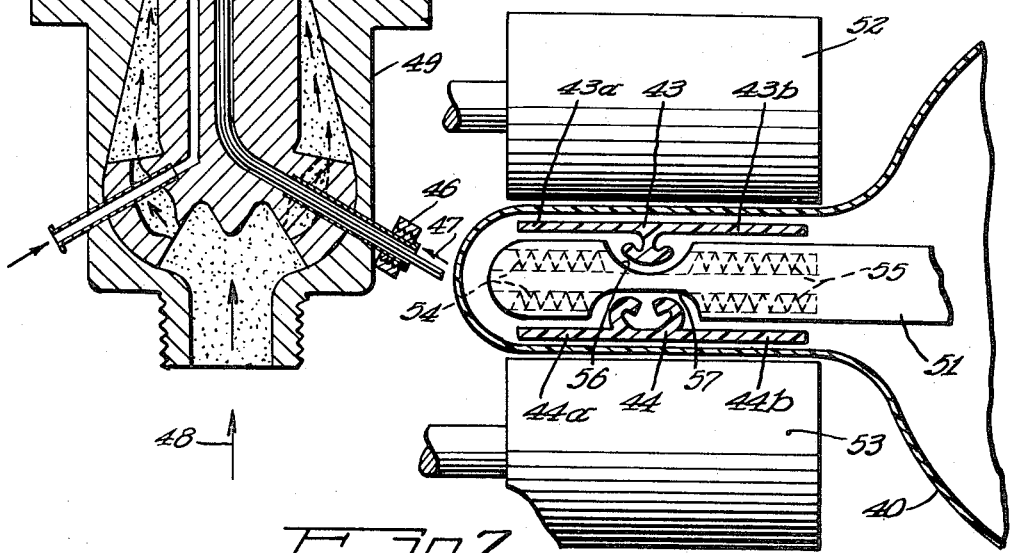

3,543,343
TUBE EXTRUDER
Karel J. Staller, Rutherford, N.J., and Steven Ausnit, New York, N.Y.; said Staller assignor, by mesne assignments, to Minigrip, Inc., Orangeburg, N.Y., a corporation of New York
Filed May 3, 1967, Ser. No. 635,818
Int. Cl. B29f 3/10; B29d 23/04
U.S. Cl. 18—14                    6 Claims

ABSTRACT OF THE DISCLOSURE

Apparatus for forming continuous plastic tubing with reclosable fastener profiles on the surface, the tubing being used to form bags by cross-cutting and cross-sealing, with the tubing initially made by the apparatus and method which includes attaching separately formed profiles to the surface of the film after it has been extruded and/or attaching a fiber tear member to the surface of the film after it has been extruded between the fastener profiles.

BACKGROUND OF THE INVENTION

The present invention relates to improvements in plastic film bags with interlocking openable and reclosable fastener profiles and more particularly to an improved mechanism, method and structure relating to such bags.

In methods and structures heretofore available plastic film bags with fasteners have been formed by manufacturing the film, such as by extrusion, and by attaching the fastener profile to the bags and strips at a later time or in a more advanced method by extruding both the film for the tube and the fastener profile together at the same time. The simultaneous extrusion of fastener profiles and film offer advantages but also incurs certain problems. Compromises and concessions must be made in the design or production of either the profile or the film so that the design of one does not seriously jeopardize the formation and resultant structure of the other. For example, the choice of plastic for the film and for the fastener profiles must be something of a compromise to obtain a satisfactory structure for each. The demands of plastic for a fastener profile are different than those for a film inasmuch as the film must be sufficiently tough and elastic to be thin and lightweight without tearing from the bag contents and the plastic of the fastener profile must be of optimum physical characteristic for slippingly and releasibly interlocking with another profile. Also, because the profiles are thicker than the film, problems such as uneven formation out of the die, uneven stresses in initial stretching of the tube, and uneven cooling occur. In addition the process of making the tube and fastener at one time slows down the speed of the extrusion as both the fastener and the film can be made much faster when extruded separately.

It is accordingly an object of the present invention to provide a method and structure for producing tubular plastic film having the advantages of film extruded with integral profiles but avoiding a number of the disadvantages.

Another object is to provide a method of providing tubular film with interlocking fastener elements thereon, which makes it possible to achieve improved production and to achieve a more precise profile of the fastener with better quality than heretofore possible.

Another object of the invention is to provide a method and mechanism for producing an improved tube structure for bags, with an elongate tear member such as a fiber line between the interlocking fastener elements for opening a bag formed from the film.

A general object of the invention is to provide an improved mechanism and method for the production of tubular film with fastener profiles thereon to be used in making reclosable bags.

A feature of the invention is the provision of a method and mechanism for extruding elongate continuous tubular film from an extrusion head and subsequently attaching to the surface of the film fastener profiles and/or a fiber tear line, preferably while the film is warm and unsolidified, in order that the film can be perfectly formed and extruded and expanded without the impairments and difficulties which attend simultaneous extrusion of profiles, so that profiles using optimum design and type of plastic can be independently formed and separately attached, after the film is expanded.

BRIEF DESCRIPTION OF THE DRAWINGS

FIG. 1 is a somewhat schematic vertical sectional view, taken through an extruding head and a film formed therefrom, showing the introduction of the fiber tear strip to the tube with an integral profile, and illustrating the principles of the invention;

FIG. 2 is a sectional view taken substantially along line II—II of FIG. 1;

FIG. 3 is a sectional view taken through a completed tubular film formed in accordance with the above method of the present invention;

FIG. 4 is a fragmentary perspective view of a tubular film being formed into bags;

FIG. 5 is a vertical sectional view shown in somewhat schematic form of a mechanism for a further process of the invention;

FIG. 6 is an enlarged fragmentary sectional view illustrating a mechanism for welding the profiles to the tube walls;

FIG. 7 is a fragmentary enlarged horizontal sectional view taken substantially along line VII—VII of FIG. 6;

FIG. 8 is a horizontal sectional view taken substantially along line VIII—VIII of FIG. 5; and FIG. 9 is a fragmentary vertical sectional view taken substantially along line IX—IX of FIG. 5.

DESCRIPTION OF THE PREFERRED EMBODIMENTS

FIGS. 1 and 2 illustrate a thin continuous plastic film tube 10 being extruded from a heated plasticized material with air 11 within the hollow tube for extending the tube and keeping the walls from touching. On the surface of the film are shaped interlocking profile elements 12 and 13 which are coactingly shaped to join and interlock when pressed together. The profiles are formed of a plastic material and are shaped to be interlocked against the forces which normally occur, but the profiles can be forcibly separated when intentionally pulled apart. This type of film tubing will be recognized by those versed in the art as being a type which is used to form plastic bags by cross-cutting and cross-sealing along the tube as illustrated in connection with FIG. 4.

The plastic film tube 10 is extruded through an annular opening 14 in an extruder head or die 15 which is supplied with heated plasticized plastic material of polyethylene or polyvinyl of the type used for forming the thin film, with the plastic supply shown schematically at 16. In the form of FIG. 1 a seperate passage 17 branches off from the main plastic supply passage 18 to form the interlocking elements just as the film emerges from the die opening 14 so that the interlocking elements and the film are integral as they emerge from the die 15.

In accordance with the present invention the bag, which is shown in FIG. 3 has a tear line 22 preferably formed of a thin thread or string of fiber placed within the bag at the top. When the tubular film is formed into bags by forming cross cuts as shown along the line 35 in FIG. 4 and cross seams as shown at 33 and 34 individual bags are formed. These bags will have flanges 31 and 32, FIG. 3, along the top edge above the interlocking elements 12 and 13. The groove and rib elements can be interlockingly joined by applying pressure to their outer surface. For separating the interlocking elements 12 and 13 the flanges 31 and 32 are drawn apart. However, before they are drawn apart, the bag is completely sealed, and to open the bag the fiber thread 22 is pulled upwardly to tear the bag material and form the separated flanges 31 and 32. The fiber thread or string 22 is attached to the plastic film so that the flanges 31 and 32 are of an equal length, although they can be of unequal length.

In positively attaching the fiber thread 22 it is adhered to the inner surface of the tube while it is being formed. For this purpose the fiber thread 22, FIG. 1, is fed between guide rollers 23 and up through a passage 21 having an opening 24 in the die within the tube. The opening is positioned so that the fiber thread engages the tube at location 25 while the plastic material is still soft and tacky. In this manner the thread adheres to the inner surface of the film tube and is maintained in place and secures itself to the film surface as the film hardens. This positively locates the fiber thread 22 and it is attached in a manner so that it does not interfere in any way with the formation of the film tube 10.

In some processes it is preferable to preheat the thread 22 and for this purpose a heater shown schematically at 26 is provided. This brings the thread to a temperature substantially the same as the temperature of the film when the fiber thread 22 engages it at location 25 so that a sudden chilling of the film does not occur. The thread, being a non-extensible material, engages the film tube at a location where it has been fully expanded or stretched so that the restraining effect of the thread 22 does not have the effect of restraining the expansion of the film which would interfere with proper grain orientation of the plastic if the thread were extruded with the plastic, and does not impair the strength or other characteristics of the film as it might if attached in methods heretofore available.

With the thread 22 in place, the film is fed upwardly over rollers 27, 28 and 29 and the flattened film will be directed to a take-up mechanism where it is formed in separate rolls, or it may be fed immediately to a bag making mechanism.

In the arrangement of FIGS. 5 through 8 a tubular plastic film 40 is extruded with air 41 inside. The film is a thin film on the order of 0.001 inch to 0.007 inch, similar to the film of FIG. 1, and is extruded from an annular opening 44 in an extruder head or die 49. A plasticized plastic material such as polyethylene or polyvinyl chloride is received from a suitable supply shown schematically at 48.

In the arrangement of FIGS. 5 through 8 the film 40 is formed completely independent of the fastener profiles 42 and 43 which are separately formed and attached to the previously formed film. In the preferred arrangement the profiles 42 and 43 are attached to the inner surface of the film at the location where the film is still soft and tacky as shown in FIG. 8.

It will be understood that in accordance with the principles of the mechanism and method of the invention the elongate elements such as the fastener profiles 42 and 43 are attached to the inner surface of the tacky film but in some circumstances they could instead be attached to the outer surface. The profiles can also be attached to the film when the film is more hardened. Substantial advantages occur in being able to form the film independently of the fastener profiles. The fastener profiles need not be made of a different type plastic but are preferably of more rigid and more springy material than the plastic of the film. With the present arrangement fastener elements can be formed independently of a separate plastic having its own physical characteristics that are independent of those of the tube film. Also material for the tube film having optimum characteristics for the tube, can be used completely independent of the plastic of the fastener profiles. Further much greater speed of extrusion both of the tube and the fastener can be achieved by making each of these independently.

The preformed fastener profiles 42 and 43 are fed into the interior of the tube 40 through an opening 45 in the die 49 from a suitable supply shown at 47. In some instances it is desirable to preheat the fastener elements to avoid the shock of the cool plastic coming into contact with the still warm film material, and for this purpose a preheater 46 is provided. Since the fastener elements, however, are preferably interlocked, the preheating must be such that the plastic of the fastener element does not fuse.

The fastener profiles 42 and 43 are in an interengaged position as they leave the opening 45 of the die 49 and are then pinched between the folded layers of the film 40 by the rollers 52 and 53.

In the present arrangement a pinched nip is taken in the tube wall bringing it together in the manner shown in FIGS. 6 and 7 and the profiles brought into the nip. The fastener elements 43 and 44 are preferably provided with strips or flanges 43a and 43b, and 44a and 44b, respectively, to provide areas for attachment to the film 40. A separator blade 51 extends between the joined fasteners separating them, and providing a backing for welding rollers 52 and 53, and preventing the fastener elements from being fused to each other by the heating element used to seal them to the film. The separator blade 51 is provided with heating elements 54 and 55 to soften the plastic of the flanges 43a, 43b, 44a and 44b to cause positive welding to the film 40. While FIG. 7 shows spaces for ease of illustration, it will be understood that the rollers 52 and 53 are spring biased so as to apply a positive pressure forcing the film 40 tightly against the heated plastic flanges of the profile elements 43 and 44. The spreader blade 51 is provided with grooves 56 and 57 to accommodate the projecting elements 43 and 44. These grooves do not contain heating elements. Other possible arrangements could provide that the rollers rather than the separator blades are heated or that both the rollers and the blades are heated.

Subsequent pinch rollers 58 and 59, FIG. 6, rejoin the profiles 43 and 44.

The film 40 with the fastener profiles 43 and 44 thus attached, passes up over rolls 60, 61 and 62 to be wound onto a storage roll, or it may be formed directly into the bags.

The fastener profile strips or the fibers are preferably heated before attachment to a tube wall in a range of 110 to 140 degrees and attached to the plastic wall at a suitable location, which is determined by the distance of this location from the opening in the die where the plastic is unsolidified and still hot in the range of 220 to 260 degrees Fahrenheit. In some instances passing the fastener profile strips or the fibers through the die itself may provide sufficient preheating.

In some instances one side of the profile may be joined to the inner surface of the tube wall before it reaches the nip, or the separated profiles can be joined to the soft plastic tube to be later interlocked.

Thus it will be seen that we have provided a mechanism and process of forming a continuous tubing for bags wherein an elongate element, either in the form of a fiber tear thread or in the form of a fastener profile is attached to the surface of the tubing subsequent to its formation. This permits handling of the film for the tube independent of considerations for the profile so that an improved tubing can be formed and so that a thinner tubing can be used inasmuch as a more uniform tube thickness and a stronger tube film is accomplished. Also stresses are not introduced into the film at areas adjacent its connection with the fastener profiles and unequal cooling and solidification do not result. Further the fastener profiles can be more perfectly formed and formed of a material of optimum physical characteristics, and both the extrusion of the film and the fastener can be carried out at a higher production rate.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A mechanism for forming continuous film for bags with an integral separable pressure reclosable fastener which comprises,
   an extruding head having a die opening for extruding plastic film with rib and groove elements on the surface,
   means for delivering heated plasticized material to said head for forming said film,
   means delivering air to the film after it has emerged from the die opening with said film solidifying as it cools after it emerges, and
   means for positioning a continuous tear element between said rib and groove elements on the surface of the film after it has emerged from the opening for attaching the tear element to the surface.

2. A mechanism for forming a continuous tubing for bags with an integral separable pressure reclosable fastener in accordance with claim 1 wherein the extruding head has an annular die opening for extruding tubular film and including a passage through said die which opens within said tube accommodating said elongate element and positioned so that the element will feed in a straight line parallel to the tubing and engage the inner surface of the film and become attached thereto.

3. A mechanism for forming continuous film for bags with an integral separable pressure reclosable fastener in accordance with claim 1 wherein said attaching means applies the elongate element to the surface of the film and parallel thereto at a location prior to its solidification so that the element adheres to the heated film and the film completes its solidification with the element in place.

4. A mechanism for forming continuous tubing for bags with an integral separable pressure reclosable fastener element in accordance with claim 2 and including means for preheating said elongate element before it is attached to the film for improving adherence to said film.

5. A mechanism for forming continuous tubing for bags with an integral separable pressure reclosable fastener which comprises,
   an extruding head having a die opening for extruding plastic film with shaped profiles thereon for forming mutually coacting interlocking rib and groove elements,
   means for delivering heated plasticized material for said head for forming said film, and
   means for locating a continuous tear element on the surface of the film between said rib and groove elements after it has emerged from the die opening for attaching the element to the film.

6. A mechanism for forming continuous film for bags with an integral separable pressure reclosable fastener which comprises
   an extruding head having a die opening for extruding plastic film,
   means for delivering heated plasticized material to said head for forming said film,
   means delivering cooling fluid onto the film after it is emerged from the die opening with said film solidifying as it cools,
   spaced fastener profile openings in said die opening forming plastic fasteners integrally on the surface of the film, an opening in the extruding head accommodating an elongate tear member and positioned to direct the tear member between said profiles for attachment to the film and for forming an opening member for bags to be formed from the film.

References Cited

UNITED STATES PATENTS

| | | |
|---|---|---|
| 1,846,325 | 2/1932 | Fischer. |
| 2,039,475 | 5/1936 | Campbell. |
| 2,096,347 | 10/1937 | Short _____ 18—13 |
| 3,058,493 | 10/1962 | Muller _____ 18—13 X |
| 2,844,846 | 7/1958 | Kronholm _____ 18—14 |
| 2,952,874 | 9/1960 | Doyle _____ 18—14 |
| 3,195,184 | 7/1965 | Svec _____ 18—12 |
| 3,303,251 | 2/1967 | Herder et al. _____ 18—14 X |
| 3,355,768 | 12/1967 | Ryan _____ 18—14 |

WILBUR L. McBAY, Primary Examiner

U.S. Cl. X.R.

18—13